June 29, 1926.

J. B. HENDERSON 1,590,977

PREVENTING THE ANGULAR MOTION OF BODIES

Filed July 26, 1919　　　3 Sheets-Sheet 1

Inventor:
James Blacklock Henderson
By Moseley and Gill
Attorneys

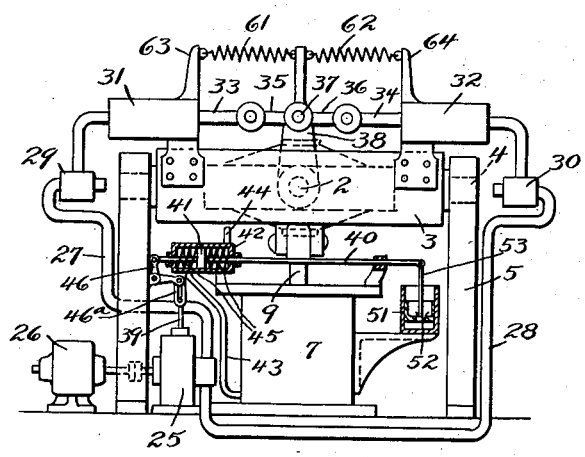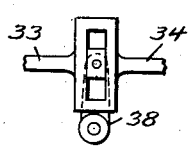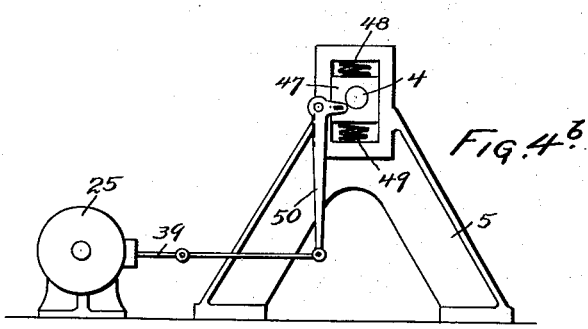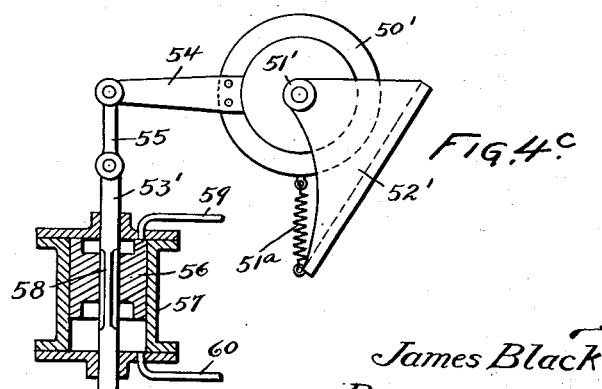

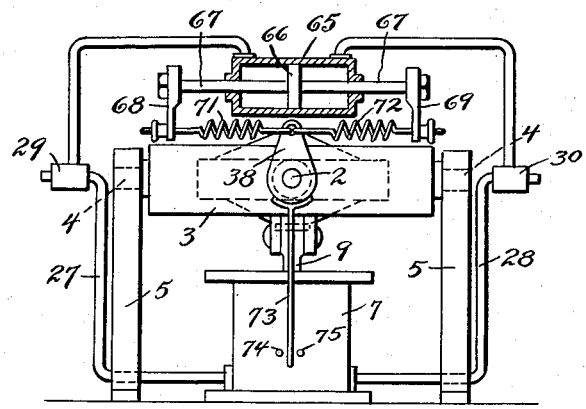
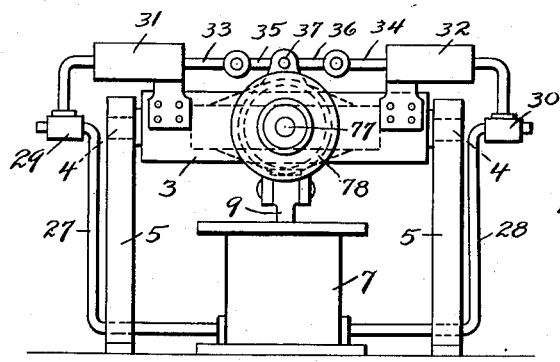
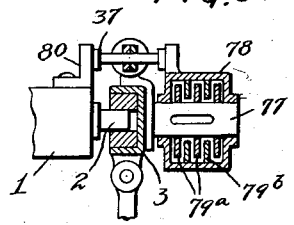
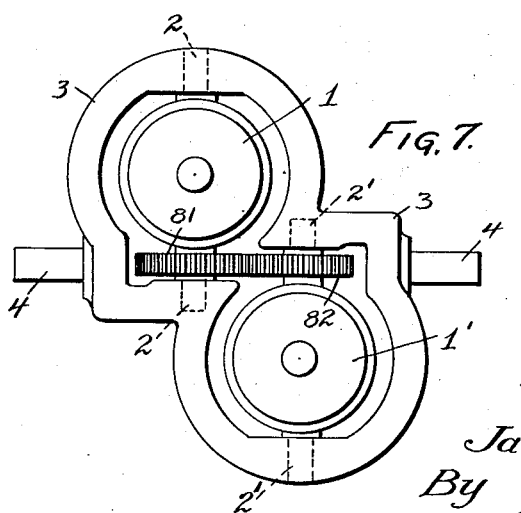

Patented June 29, 1926.

1,590,977

UNITED STATES PATENT OFFICE.

JAMES BLACKLOCK HENDERSON, OF LEE, ENGLAND.

PREVENTING THE ANGULAR MOTION OF BODIES.

Application filed July 26, 1919, Serial No. 313,536, and in England June 14, 1915.

My invention relates to gyroscopic methods of preventing angular movement of bodies, such as the rolling or pitching of ships, aeroplanes, monorail cars, guns on board ship or other bodies subjected to angular motion. The following description will be worded for simplicity so as to apply to the rolling of ships, by way of illustration.

The idea of using gyroscopes for reducing or preventing the rolling motion of ships due to the external periodic impulses produced by the waves is old, and the essential feature in all such applications of the gyroscope is that the external forces are transmitted through the ship to a gyroscope which is thereby caused to precess. The axis of the rotor of the gyroscope is normally in the plane of the motion to be damped and the trunnion axis about which precession takes place is also in this plane. Under such conditions the gyroscope opposes the external force and the ship cannot roll unless some force resists the gyroscopic precession about the trunnion axis. Any force which resists the precession introduces a precession in the plane of the external forces and therefore produces rolling of the ship.

The forces which resist precession are friction and the inertia reaction of the gyroscope about its trunnion axis, although the inertia tends to accelerate the precession when the latter is decelerating. If the gyroscope is also controlled in its central position about the trunnion axis by springs, the spring force also tends to accelerate or decelerate the precession.

If the rolling motion is to be completely damped out there must be no resistance positive or negative to the motion about the trunnion axis, hence forces must necessarily be applied to this axis to overcome (1) the friction forces (2) the inertia forces (3) the spring control of the trunnion axis.

Many inventors have suggested methods of overcoming these three forces, some aiming at overcoming one or two of these forces only, others employing three separate mechanisms to produce the three forces in their proper phases.

The object of my invention is to provide a mechanism which will automatically apply to the trunnion axis, forces in their proper phase relation to overcome all three resistances due to friction, inertia and spring control. To achieve this end, I do not differentiate between these forces but I control the velocity of precession about the trunnion axis by a source of power large enough to supply any force positive or negative likely to be required, at all possible speeds of precession, and I connect the source of power with the trunnion axis by a continuously variable speed gear and adjust the variable speed gear automatically so that the speed of precession is always simply proportional to the externally applied forces on the ship. If then the velocity of precession is adjusted to be equal to the value $$\frac{L}{I\Omega \cos \varphi}$$

where L is the external couple, $I\Omega$ the angular momentum of the rotor and $\varphi$ the angle the rotor axis makes with the plane of rolling, the three forces of friction, inertia and spring control, will be automatically compensated. Thus by means of one mechanism which controls the velocity I produce complete compensation.

My invention will now be described with reference to the accompanying drawings in relation to the damping of the rolling of a ship but it is to be understood that it is equally applicable to monorail cars, aeroplanes, guns on board ship or other bodies subjected to angular motion.

Figs. 4, 4ª, 4ᵇ and 4ᶜ show an arrangement for controlling the precession by means of a continuously variable speed gear.

Figs. 5 and 6 show alternative arrangements of speed gears.

Fig. 6ª is a sectional view of the variable speed gear in Fig. 6.

Fig. 7 shows an arrangement of two gyroscopes to eliminate the effects of pitching or rolling and rolling or pitching of the ship.

Figure 1:
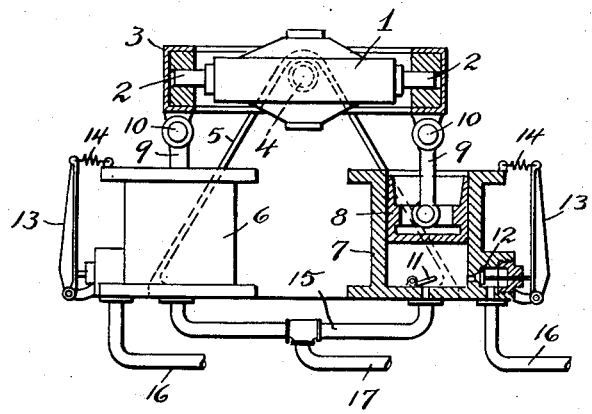
Figs. 1 and 2 show two elevations of a general arrangement of the gyroscope and the hydraulic cylinders which connect it to the ship.
Figure 2:
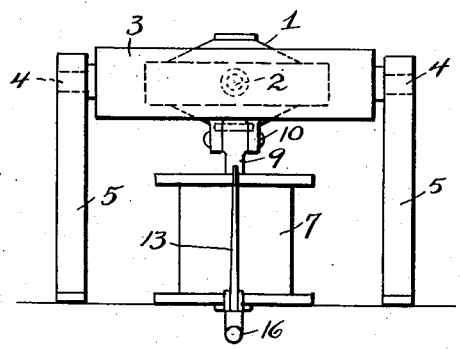

In Figs. 1 and 2, the rotor casing 1 of the gyroscope is pivotally mounted on the trunnion bearings 2 fixed to the gimbal ring 3 which is carried on the trunnions 4 in the two bracket supports 5 which are bolted to the ship's deck so that the trunnion axis 4 is fore and aft in the ship. Angular motion of the gimbal ring 3 about the trunnions 4 is constrained by the two single acting pumps 6 and 7 the pistons 8 of which are connected by the connecting rods 9 with gudgeon pins 10 attached to the gimbal ring 3. The two pumps 6 and 7 are arranged symmetrically on opposite sides of the trunnion 4. The inlet valve 11 of the pump 7 opens freely but the delivery valve 12 is loaded by means of the lever 13 and the spring 14, like an ordinary safety valve, so that it does not open until the pressure in the cylinder 7 reaches a predetermined limit; this limit being fixed by the safe working stresses in the gyroscope spindle. The suction and delivery pipes 15 and 16 lead to a water tank or to the sea through the ship's plating considerably below the water line.

When a wave strikes the ship and she tends to roll the pressure in one of the cylinders 6 or 7 immediately rises, tending to force the gimbal ring 3 and gyro casing 1 to roll with the ship. The gyroscopic action of the rotor prevents the gimbal ring 3 and outer casing 1 from rotating in space about the trunnion axis 4 so long as the casing 1 is free to precess about the trunnion axis 2. Any restraint about the axis 2 either due to friction or due to inertia during acceleration of the casing and rotor about the trunnion axis 2, causes the gyroscope to yield to the pressure applied to the piston 8, and the ship rolls through a small angle in consequence. Should the external couple on the ship due to the waves be so great that the safe limit of stress in the gyroscope spindle would be exceeded, if rolling were prevented, the safety valve 12 opens and the ship is allowed to roll, but against a constant resistance so long as the valve remains open.

Figure 3:
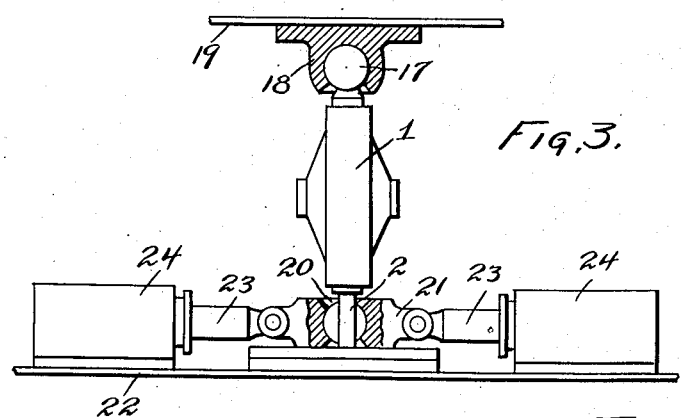
Fig. 3 shows an alternative general arrangement of the gyroscope.

An alternative arrangement of the gyroscope is shown in Fig. 3, in which the gyro casing 1 is placed with the rotor axis horizontal and athwartships. It is suspended on a ball or universal joint 17 supported by the block 18 which is fixed to deck frames 19. The lower trunnion axis 2 is constrained by the spherical bearing 20 which is carried by the slide block 21 which can slide athwartships in guides on the deck 22, the sliding motion being constrained by the two rams 23 working in the hydraulic cylinders 24.

I control the precession of the gyroscope casing about the trunnion axis 2 by means of a continuously variable speed gear. This speed gear may be of any suitable type but in Fig. 4 which shows a preferred form of variable speed gear it is illustrated as a variable stroke pump 25 driven by an electric motor 26, the suction and delivery pipes 27 and 28 of the pump being connected through hinged couplings 29 and 30 with two hydraulic cylinders 31 and 32 mounted on the gimbal ring 3. The rams 33 and 34 of these cylinders are connected by connecting rods 35 and 36 with the crank pin 37 on the crank 38, which is fixed to the trunnion 2 of the gyro case. In applying the variable speed gear to the arrangement of Fig. 3 the same disposition of parts would be followed, the lower trunnion axis 2 being provided with a crank to which the connecting rods and the rams may be attached. It will be obvious that the swash plate type of variable speed gear may be replaced by any well known mechanical type of variable speed gear.

Alternatively I may replace the two connecting rods 35 and 36 by a slotted link mechanism as illustrated in Fig. 4ª. If I employ the connecting rods 35 and 36, I arrange the axis of the cylinders 31 and 32 to pass through the centre of the crank pin 37 when the crank is vertical, but if I use the slotted link the centre line of the cylinders may be on any level. The object of this arrangement is to compensate automatically for the inclination of the rotor axis to the vertical while precessing around the trunnion axis 2. If this inclination be denoted by $\varphi$ the angular momentum which is effective in stabilising is proportional to cos $\varphi$, and for a given velocity of the plungers 33 and 34 the angular velocity of the crank 38 is inversely proportional to cos $\varphi$, hence the inclination of the gyro axis to the vertical is automatically compensated. In other words, the speed of the rams is fixed mechanically and the resistance opposed to their motion does not affect their speed.

In order to prevent rolling of the ship the velocity of the plungers 33 and 34 must be simply proportional to the externally applied couple, that is, it must be simply proportional to the difference of pressure on the cylinders 6 and 7, and the ratio between them must have a certain value. I arrange this by connecting the arbor 39 which varies the stroke of the pump 25 by a link 46ª and a bell crank 46 to a piston rod 40, the piston 41 being moved in the cylinder 42 by the difference of pressure between the two main cylinders 6 and 7 conveyed through the connecting pipes 43 and 44. The piston 41 moves under the combined action of the hydraulic pressure and the two springs 45, which normally keep it centred in the cylinder 42, so that the motion of the piston 41 and the stroke of the pump 25 are simply proportional to the difference of the pressures in cylinders 6 and 7.

Alternatively I may employ the elastic strain in some suitable part of the gyro mechanism or ship's structure to actuate the arbor of the variable speed gear. One arrangement is illustrated in Fig. 4ᵇ. The trunnions 4 are pivoted in bearing blocks 47 which are supported on the brackets 5 between two stiff springs 48 and 49. Any up and down motion of the block 47 is magnified by the bell-crank 50 and transmitted to the arbor 39 of the variable stroke pump 25. In this particular arrangement it would be necessary to have both main pump cylinders 6 and 7 (not shown in the figure) the pistons of which are connected to the gimbal ring 3 on the same side of the trunnion axis 4, so that the motion of the block 47 would reverse with a reversal in the external couple. This will be clear if one considers, with reference to Fig. 1 for example, the forces introduced by the wave motion during rolling. When the roll is in one direction so that pressure develops in cylinder 6 for example the reaction on the trunnions 4 is downwards and when the roll is in the other direction the pressure develops in cylinder 7 on the other side of the trunnion axis, the trunnion reaction is still downwards. The two single acting pumps might in such a case be conveniently replaced by a double acting one.

To prevent instability arising due to the method of controlling the precession by the variable speed gear, I may fit a dash pot 51 (Fig. 4) the piston 52 of which is connected by the connecting rod 53 with the tail end of the piston rod 40, in such a manner that when the piston 41 is in its central position the connecting rod 53 is vertical. I fit valves to the piston 52 to open on the downward motion of the piston but not on the upward motion. Hence the motion of the piston 41 is constrained when moving outwards from its central position but is unconstrained when moving inwards.

As an alternative method of preventing instability arising in the control of the precession I may employ an inertia governor as illustrated in Fig. 4ᶜ.

The flywheel or inertia bar 50' is mounted in neutral equilibrium on knife edges or ball bearings 51' in the bracket 52' which is attached to the frame 5 supporting the gyroscope or it may be attached to the ship's structure but in either position the axis of the flywheel 50' is fore and aft in the ship. A light spring 51ᵃ controls the flywheel relatively to the bracket. Any angular displacement of the flywheel 50' displaces the throttle valve 53' which is connected to the flywheel by the arm 54 and the connecting rod 55. The valve seat consists of a sleeve 56 which can slide like a piston from end to end of the valve casing 57. The valve 53' has long grooves 58 cut in it of such a length that one end of the groove acts as the throttle when the sleeve 56 is at one end of the cylinder 57 and the other end of the groove acts similarly when the sleeve is at the other end of the cylinder. The two pipes 59 and 60 are connected respectively with the two pipes 27 and 28 in Fig. 4 so that a by-pass is formed between the delivery and suction of the variable stroke pump. The sleeve 56 automatically moves to one or the other of the two ends of the cylinder according as the supply is transmitted through the pipes 59 or 60; and the inertia wheel modifies the amount of the throttling by the motion of the valve 58. I may alternatively connect the pipes 59 and 60 with the pipes 43 and 44 thus providing a by-pass between the two sides of the piston 41 in the auxiliary cylinder 42.

The action of the governor is as follows:— If the velocity of precession of the gyro about the trunnion 2 is not properly adjusted by the variable stroke pump 25, the ship rolls either against or with the impressed force introduced by the waves. In either case the flywheel 50' turns on its axis relatively to the ship through a small angle thereby either opening further or closing the throttle valve 58. The arm 54 is placed on the flywheel 50 so that if the ship rolls against the external force due to the waves, the flywheel is displaced so as to open the throttle valve and thus automatically diminish the precessional velocity of the gyroscope. If the ship rolls in phase with the external forces due to the waves, the flywheel is displaced so as to close the throttle valve and thus automatically increase the precessional velocity of the gyroscope. At the end of each roll the sleeve 56 of the throttle valve automatically moves from end to end of the valve casing 57 so that the motion of the flywheel which formerly opened the throttle valve now closes it.

As the wave force dies down the precessional velocity decelerates and the deceleration of the case absorbs a proportion of the difference of pressure between the two cylinders 31 and 32 due to the inertia of the gyro and its case. The difference of pressure between the pipes 27 and 28 thus reverses before the precession stops, thereby causing the sleeve 56 to move from end to end of the valve casing too soon. To obviate this I supply most of the forces required to accelerate the gyro and its casing round the trunnion 2 by means of two centring springs 61 and 62 (Fig. 4) which are attached between the end of the crank 38 and two lugs 63 and 64 attached to the cylinders 31 and 32. I arrange the stiffness of the springs so that the period of free oscillation of the gyro on the trunnions 2 (i. e. with the connecting rods 35 and 36 disconnected and the rotor stationary) is approximately equal to the period of the waves. These springs have the double purpose of serving to keep the gyro axis from straying from the vertical when the ship is not rolling and also of supplying most of the forces required to accelerate and decelerate the precessional motion.

I may increase the inertia of the flywheel

50′ by incorporating a gyroscope or gyroscopes with it so as to increase its period of oscillation about the axis. The method of doing this is well known and requires no illustration.

It has been proposed to use in the control of gyros for damping the rolling of ships a small constrained gyro forced to roll with the ship but free to yaw against springs, i. e. a gyroscopic meter for measuring the velocity of roll. This arrangement forms no part of my invention.

A considerable simplification of my invention is possible if the water in the main pump cylinders is employed to drive the variable speed gear, which may then take the form shown in Fig. 5 in which a hydraulic cylinder 65 is fixed to the gimbal ring 3 on suitable brackets, not shown in the diagram. The piston 66 and piston rod 67 carry two projecting arms 68 and 69 which are connected with the end of the crank 38 by two links or stiff springs 71 and 72. The two ends of the cylinder 65 are connected with the two main pump cylinders by two pipes 27 and 28 through the unions 29 and 30. These pipes are, in this case, of small bore so that the flow through them is "steady" viscous flow and the drop in pressure in the pipes is proportional to the velocity of flow, thus making the velocity of the piston 66 simply proportional to the difference of pressure in the main pump cylinders. The drop of pressure in the pipes is great compared with the pressures on the piston 66. The crank 38 may be centred by two spiral springs similar to those shown in Fig. 4 or by a cantilever spring 73 which lies between two stops 74 and 75. This latter is a convenient type of spring for adjusting the period of oscillation of the gyroscope about the axis 2 to agree with the period of the waves, by fitting the stops 74 and 75 on a vertical slide and raising or lowering the slide. Alternatively I may arrange a variable speed gear consisting of a viscous fluid brake as is illustrated in Figs. 6 and 6ª, in which the brake 78 has the fixed plates 79ª (Fig. 6ª) keyed to a shaft 77 which is fixed to the gimbal ring 3 coaxial with the trunnion 2. The outer case 78 of the brake carrying the plates 79ᵇ turns on the shaft 77 and the space between the plates is filled with a viscous fluid. A crank 80 attached to the gyro casing or to the trunnion 2 carries the crank pin 37 which engages with the outer casing 78 of the brake so that the brake casing is forced to turn with the gyro casing about trunnion 2 and the brake resists this turning. The hydraulic cylinders 31 and 32 are connected with the main pump cylinders by large bore pipes 27 and 28, and the plungers 33 and 34 are connected with the crank pin 37 by the connecting rods 35 and 36. The full difference of pressure between the main pump cylinders 6 and 7 thus drives both the brake 78 and the gyro case round the axis 2. Most of this driving force is absorbed by the brake so that the velocity of the brake and gyro case is simply proportional to the difference of pressure in the pump cylinders 6 and 7. The brake thus serves as a variable speed gear controlling the velocity of precession of the gyro.

The arrangements above described with reference to Figs. 5 and 6, I term variable speed gears of the viscous resistance type as they operate as variable speed gears similarly to that described with reference to Fig. 4.

Since the damping of the roll introduces couples tending to make the ship pitch, so when the ship pitches a single gyroscope must introduce couples tending to make her roll. To annul the effective couple in the plane of pitching I may duplicate the whole apparatus making the two gyroscopes revolve in opposite directions. Instead of duplicating the whole apparatus I may only duplicate the gyroscope portions as shown in Fig. 7, in which the two gyro cases 1 and 1′ are mounted on trunnions 2 and 2′ in a frame 3 which is pivoted on trunnion 4. The trunnions 2 and 2′ are connected by the toothed wheels 81 and 82 so that the gyros can only precess about these trunnions in opposite directions. The two rotors revolve in opposite directions and the frame 3 is mounted on the ship in place of the single gimbal ring 3 in Fig. 4.

While the invention has been shown and described particularly with reference to its application to preventing the rolling of ships or other stable bodies, it will be understood that the invention is equally adapted for use with unstable bodies, such as air-craft, monorail cars and the like, and also that various changes may be made in details of the apparatus without departing from the principle of the invention as defined in the appended claims.

Having now particularly described and ascertained the nature of my said invention and in what manner the same is to be performed, I declare that what I claim is:—

1. In gyroscopic apparatus for preventing the angular movements of bodies the combination of fluid pressure means for transmitting external forces to the gyroscope, fluid pressure means for controlling the velocity of precession of the gyroscope, and variable speed mechanism for controlling said fluid pressure means in accordance with a function of the external forces.

2. In gyroscopic apparatus for preventing the angular movements of bodies, the combination of fluid pressure means for transmitting external forces to the gyroscope, and means associated with said fluid pressure means for relieving the pressure in said first named means when it reaches a predetermined value.

3. In gyroscopic apparatus for preventing the angular movements of bodies, the combination of fluid pressure means for transmitting external forces to the gyroscope, fluid pressure means for controlling the velocity of precession of the gyroscope, and safety valves associated with said means for limiting the stresses imparted to the gyroscope by the external forces.

4. In gyroscopic apparatus for preventing the angular movements of bodies, the combination of fluid pressure means for transmitting external forces to the gyroscope, fluid pressure means for controlling the velocity of precession of the gyroscope, and variable speed mechanism for controlling said last named fluid pressure means.

5. In gyroscopic apparatus for preventing the angular movements of bodies, the combination of a gyroscope, fluid pressure means for transmitting external forces to the gyroscope, means for overcoming the forces which oppose precession of the gyroscope produced by the external forces and means under the control of the fluid pressure means for controlling the force overcoming means.

6. In gyroscopic apparatus for preventing the angular movements of bodies, the combination of fluid pressure means for transmitting external forces to the gyroscope, means for controlling the velocity of precession of the gyroscope, variable speed mechanism for controlling said controlling means, and means under the control of said fluid pressure means for controlling the variable speed mechanism.

7. In gyroscopic apparatus for preventing the angular movements of bodies, the combination of a gyroscope, fluid pressure means for transmitting external forces to the gyroscope and means under the control of the fluid pressure means for overcoming the forces which oppose precession of the gyroscope produced by the external forces.

8. In gyroscopic apparatus for preventing the angular movements of bodies, the combination of a variable speed mechanism for controlling the precession of the gyroscope produced by an external couple, and mechanism for automatically compensating for the variation of the inclination of the axis of the rotor of the gyroscope to the axis of the external couple.

9. In gyroscopic apparatus for preventing the angular movements of bodies, the combination of a continuously variable speed mechanism controlled by fluid pressure supplied by the external forces and viscous fluid means adapted to be overcome by the external forces for controlling said mechanism.

10. In apparatus for preventing the angular movements of bodies due to the effect of periodic external forces the combination of a gyroscope and springs connected to the precession axis of the gyroscope for controlling the precession produced by the external forces, said springs being adjusted to produce a period of free oscillation of the gyroscope with its rotor not revolving approximately equal to the period of the external forces.

11. In gyroscopic apparatus for preventing the angular movements of bodies, the combination of a gyroscope, means for transmitting external forces to the gyroscope, means for controlling the velocity of precession of the gyroscope, mechanism actuated by the force transmitting means in accordance with the external forces for controlling the precession controlling means and means for controlling the mechanism to prevent instability.

12. In gyroscopic apparatus for preventing the angular movements of bodies, the combination of a gyroscope, means for transmitting external forces to the gyroscope and means actuated by the force transmitting means for applying to the gyroscope a force proportional to the external forces to compensate for the forces which oppose precession of the gyroscope.

Dated this 11th day of December 1915.

JAMES BLACKLOCK HENDERSON.